Jan. 23, 1962 J. C. QUAYLE 3,018,319
COMPRESSION DEAD END SPLICE
Filed Sept. 25, 1959 6 Sheets-Sheet 1

INVENTOR.
JACKSON C. QUAYLE
BY
Williams, Tilbury & Dobrick
ATTORNEYS

Jan. 23, 1962   J. C. QUAYLE   3,018,319
COMPRESSION DEAD END SPLICE
Filed Sept. 25, 1959   6 Sheets-Sheet 2

INVENTOR.
JACKSON C. QUAYLE
BY
Williams, Tillbury & Gobrick
ATTORNEYS

INVENTOR.
JACKSON C. QUAYLE

INVENTOR.
JACKSON C. QUAYLE
BY
ATTORNEYS

Jan. 23, 1962 J. C. QUAYLE 3,018,319
COMPRESSION DEAD END SPLICE
Filed Sept. 25, 1959 6 Sheets-Sheet 5
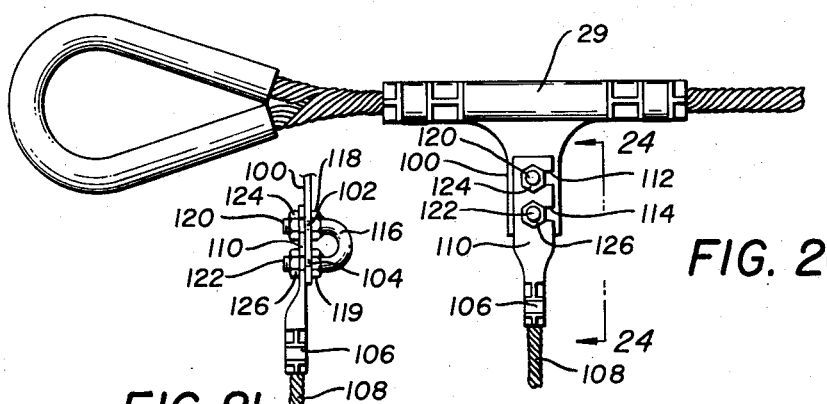
FIG. 20
FIG. 21
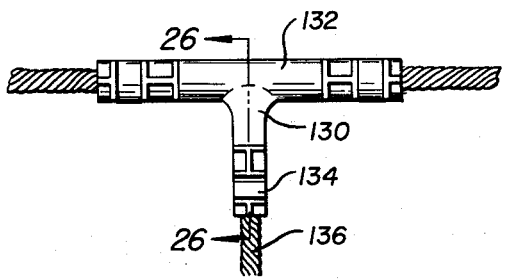
FIG. 22
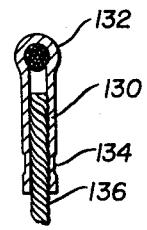
FIG. 23
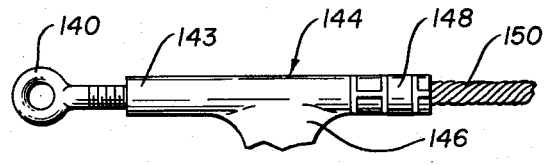
FIG. 24
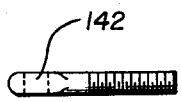
FIG. 26
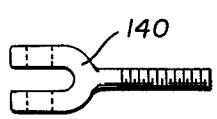
FIG. 25
INVENTOR
JACKSON C. QUAYLE
BY Williams, Tilbury & Gobrick
ATTORNEYS

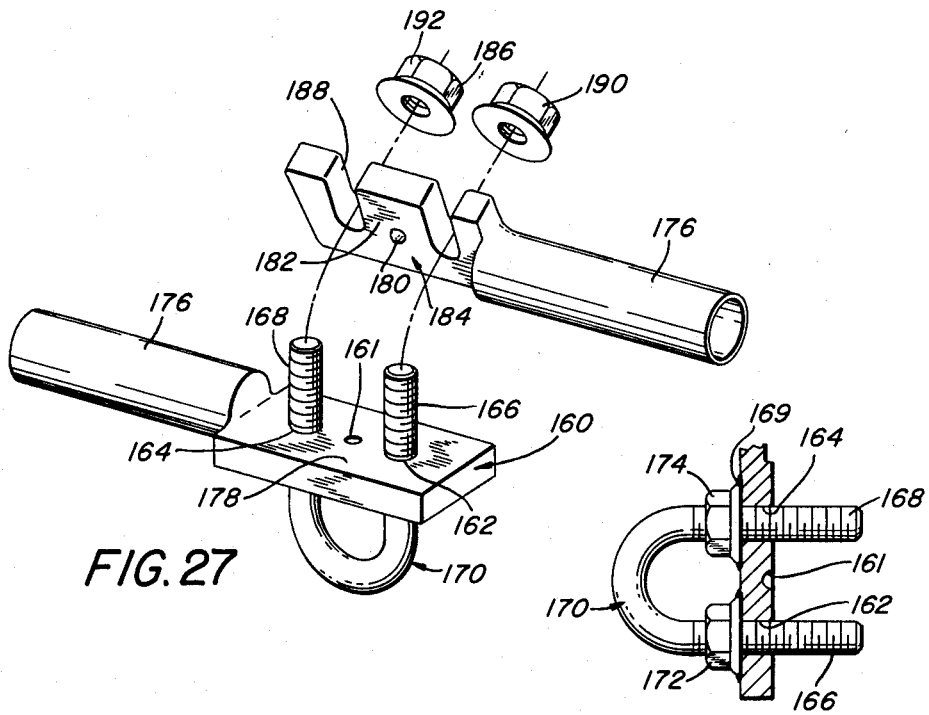
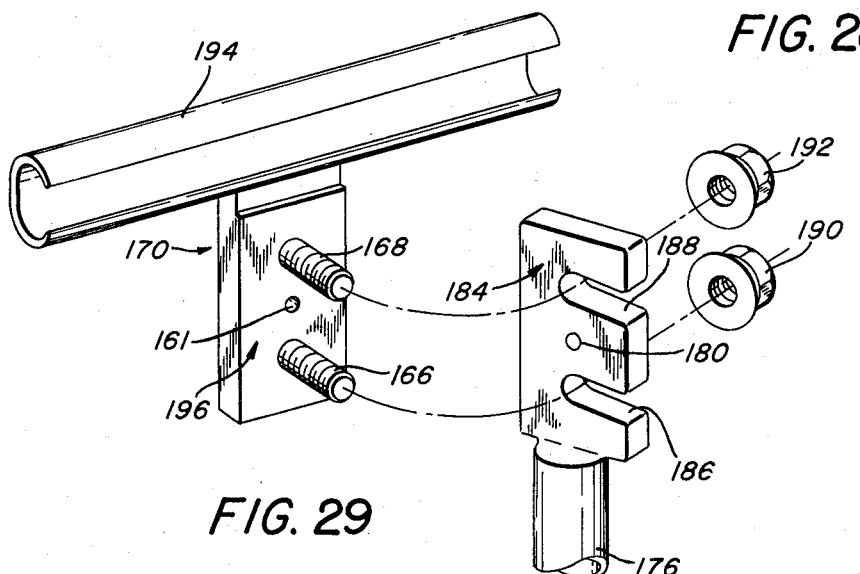

United States Patent Office 3,018,319
Patented Jan. 23, 1962

3,018,319
COMPRESSION DEAD END SPLICE
Jackson C. Quayle, 919 Caledonia Ave.
Cleveland Heights, Ohio
Filed Sept. 25, 1959, Ser. No. 842,318
10 Claims. (Cl. 174—79)

This invention relates in general to a device for dead ending overhead line conductors, and specifically relates to a device for dead ending insulated line conductors. The invention is further applicable, however, for dead ending cable or wire employed for mechanical rather than electrical purposes.

By way of definition for the purposes of this application, a so-called "dead end" is a device for securing or anchoring a cable or wire extremity subjected to conditions of tension. In a more limited sense, a "dead end" is a device for securing the extremity of a cable or wire to an insulator or thimble anchored or attached to a pole structure, another cable or wire, tower structure, or building. Hereafter, reference to cable alone will generally be understood to also include wire when applicable.

Heretofore, it has been the practice of the prior art to pass the end of a cable around an insulator or thimble, double the cable back upon itself, and then secure the running portion and the standing portion by means of a U-bolt clamp or similar fastening device. There are several disadvantages to this method of dead ending a cable, i.e., insulators or thimbles are not always available or practical to use having optimum radii of curvatures suited to the mechanical requirements of dead ending by bending the cable back upon itself.

Further, it is difficult to insulate a cable clamp because of its bulky and irregular shape. As a consequence, insulators of standard diameter are usually employed, and the cable is forced about the smaller diameter of the standard insulators, resulting in a distortion and crushing of the cable. When a cable is disformed, the individual strands do not tension evenly, and instead become crossed so as to bear against one another in such manner as to cause shearing. This results in individual strand failure and ultimately in failure of the cable. Certain other difficulties are also experienced in working with so-called "hot" or energized high voltage lines. For instance, cable clamps of the standard variety are not ideally suited for manipulation with "hot line" tools, i.e., insulated tools used by linemen under hazardous working conditions.

It is, therefore, among the objects of this invention to provide: a dead end device which does not decrease the overall strength and efficiency of the cable; which is susceptible to relatively easy connection to hot lines; which is amenable to the application of insulating tape and the like; which either requires no threaded fasteners or utilizes improved threaded fasteners; which is easily installed with "hot line" tools; which can be used in both mechanical and electrical applications; which provides means to make an assembled insulated splice connector insertable in a live conductor to render it mechanically continuous but electrically discontinuous; and which is generally more serviceable and safer in application and use than present devices.

Other features of this invention, which are believed to be novel, are set forth with particularity in the appended claims. The invention itself, however, both as to its organization and use, together with further objects and advantages thereof, may best be understood by reference to the following description taken in conjunction with the accompanying drawings in which:

FIGURE 20 illustrates a modified embodiment of my invention adapted to enable a tap conductor to be attached to the splicing sleeve in order to utilize the electrical properties of the device;

FIGURE 21 is a sectional view taken on the line 21—21 of FIGURE 20;

FIGURE 22 illustrates yet another modified embodiment of my invention adapted to enable a tap conductor to be attached to the splicing sleeve in order to utilize the electrical properties of the device;

FIGURE 23 is a sectional view taken on the line 23—23 of FIGURE 22;

FIGURE 24 illustrates a modified fastening means employed in association with a splicing sleeve as an alternative to the bale fastener shown in FIGURE 20;

FIGURE 25 is another view of the fastening means of FIGURE 24 shown as a clevis;

FIGURE 26 is another view of the fastening means of FIGURE 24 shown as an eye bolt;

FIGURE 27 is a perspective exploded view of a preferred line connector employed in my invention similar to FIGURE 21;

FIGURE 28 is a partially sectioned fragmentary view of a portion of FIGURE 27 illustrating the means for connecting the U-bolt to the tab member; and, FIGURE 29 is a perspective exploded view of a modified embodiment of the invention shown in FIGURE 27.

Figure 2:
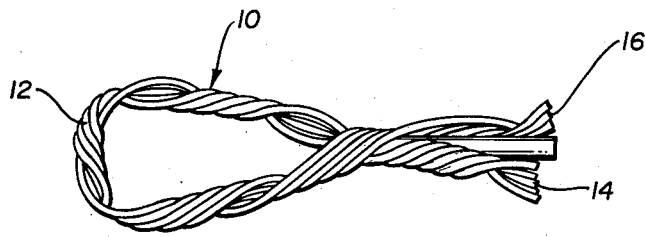
FIGURE 2 illustrates a partially completed half-lay of helically preformed elements employed in a preferred embodiment of my invention to form a cable dead end bight.
Figure 8:
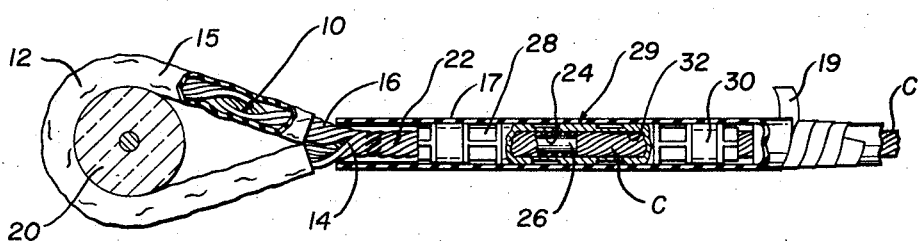
FIGURE 8 illustrates a bight prepared from helically preformed elements in co-acting relationship with other elements utilized in a preferred embodiment of the invention to provide a dead end device secured to a cable.
Figure 9:
FIGURES 9 and 10 illustrate yet another helically preformed element which may be utilized in a preparation of the bight end of the cable dead end device in accordance with the teaching of the invention.
Figure 10:
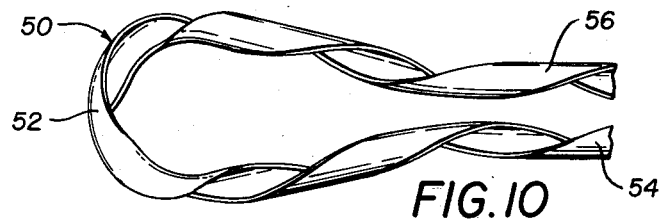

Reference is now made to the figures in greater detail, and in particular to FIGURE 8 which illustrates one of the preferred embodiments of my invention in the assembled state. The general arrangement of parts of this embodiment of my dead end device includes a half-lay member of preformed helical elements 10 including a center or bight portion 12 and end or leg portions 14 and 16 (see also FIGURES 2 and 3). For the purposes of this application, I define a full-lay to be the plurality of helically preformed elements or strands which, when layed in adjacent relationship one with the other, develop a 360° surface. I further define a half-lay to be one-half of adjacent helical elements comprising a full-lay.

Figure 1:
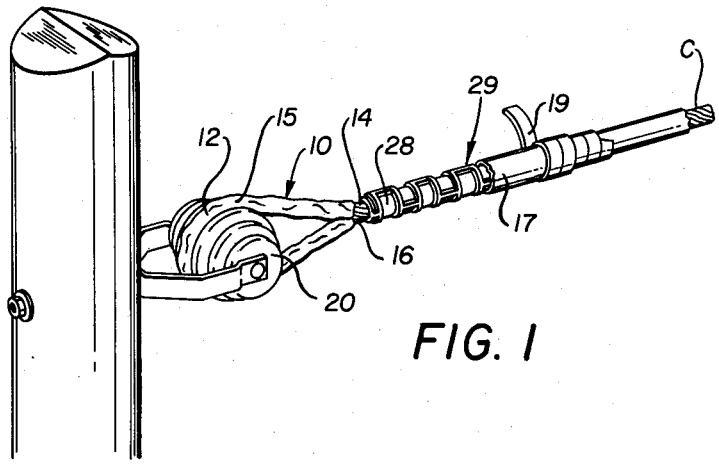
FIGURE 1 is a perspective view of an embodiment of my invention as seen in association with a pole line construction.
Figure 3:
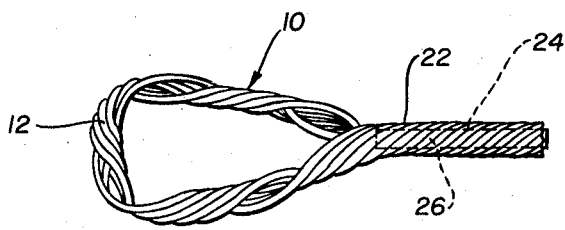
FIGURE 3 is similar to FIGURE 2 and shows a completed half-lay of helically preformed elements forming a bight employed in a preferred embodiment of the invention.
Figure 4:
FIGURES 4 and 5 illustrate another means of forming a bight which can be used in my invention, said bight comprising the utilization of half-lays of helically preformed elements.
Figure 5:
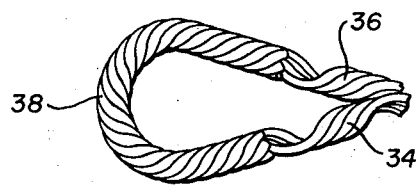

The bight 12 is positioned about a thimble or an insulator 20, and the leg portions 14 and 16 are helically twisted together to form a cable whole lay portion 22 defining a hollow core 24 adapted to encase the cylindrical core insert member 26 (see FIGURE 3). One end 28 of a compression sleeve member 29 (see FIGURES 1 and 8) is slipped over the whole lay portion 22 and compressed to form both a mechanical and electrical connection between the sleeve member 28 and the whole lay portion 22. The other end 30 of the compression sleeve member is provided with a hollow core 32 adapted to receive the end of the cable C therein, whereupon this end of the sleeve is also compressed to form both a mechanical and electrical connection between the sleeve and the cable or wire. In the dead end application, it is primarily the mechanical connection that is of importance, but it is conceivable that other applications of my invention will require good electrical connection (see FIGURES 20 and 22) in addition to a good mechanical connection, and it is noted at this time that the electrical connection is also inherent in this arrangement. To this end, it will be observed from an inspection of FIGURES 1 and 8 that sleeve insulation means 15 and 17, as well as insulating tape 19, are easily and readily fitted about and otherwise applied to the dead end.

Where a solid or full lay portion is desirable in the bight zone 12 of the device, I contemplate employing a pair of half-lay helically preformed members 34 and 36 (see FIGURES 4 and 5) helically assembled in overlapping relationship to form a whole lay bight portion 38.

Figure 6:
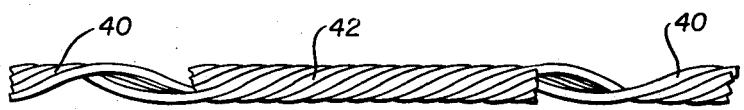
FIGURES 6 and 7 illustrate yet another means of forming a bight which can be used in the invention, utilizing yet another arrangement of helically preformed elements.
Figure 7:
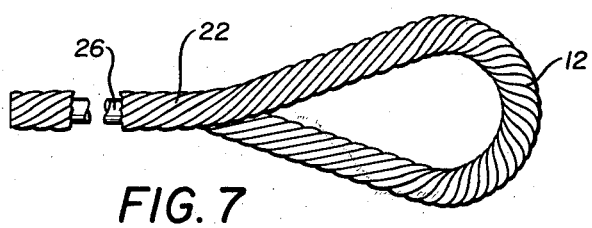

Yet another arrangement of the same basic idea is the employment of a half-lay member 40 (see FIGURE 6) having joined thereto at its center portion, a short half-lay member 42 which, when helically twisted with the longer half-lay member 40, forms a whole lay portion at the bight area of the device.

The bight portion of my invention illustrated in FIGURE 8 contemplates the employment of helically preformed strands such as are common in the cable manufacturing art. Another embodiment of my invention, however, contemplates the use of a helically preformed flat strap member as illustrated in FIGURES 9 through 15. In these figures the member 50 is helically preformed throughout its length and then doubled back upon itself to form a bight 52. The leg portions 54 and 56 of the member then may be twisted together in helical fashion to define the hollow core adapted to receive the cylindrical core member 26 therein (see in particular FIGURE 15).

Figure 11:
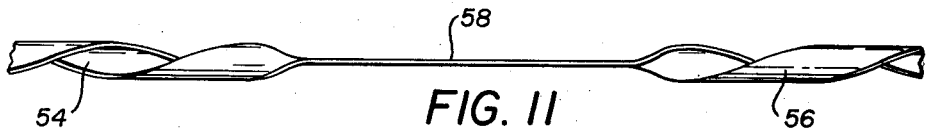
FIGURES 11 and 12 illustrate a modified version of the helically preformed element disclosed in FIGURES 9 and 10 wherein the bight portion of the element is of flat rather than helically preformed stock.
Figure 12:
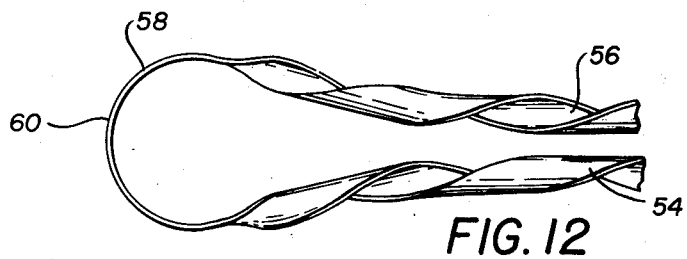

In order to increase the bearing surface of the bight portion of the strap member 50 against the insulator 20, I provide, as shown in FIGURES 11 and 12, a flat strap portion 58 in the center of the member which, when doubled back upon itself, comprises the bight 60 of the device.

Figure 13:
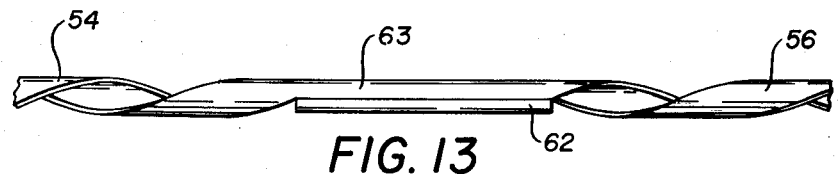
FIGURES 13 and 14 illustrate still another arrangement for providing a bight in co-action with other elements of the invention and comprises a cylindrical member forming the bight of the device in combination with helically preformed leg portions.
Figure 14:
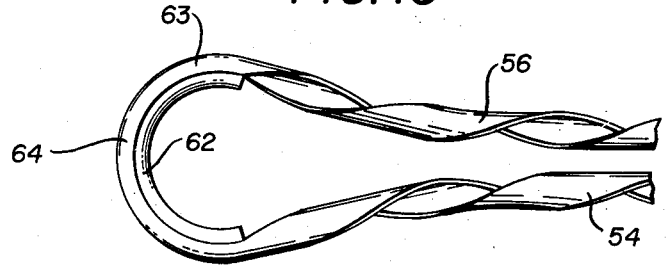
Figure 15:
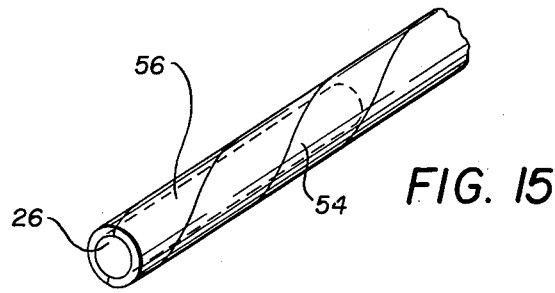
FIGURE 15 illustrates a core member in secured association with leg portion 5 of the helically preformed element.

As shown in FIGURES 13 and 14, I contemplate the use of cylindrical stock 62 in combination with preformed helical flat stock 63 to constitute the bight portion 64 and the leg portions 54 and 56 respectively. Again, the leg portions 54 and 56 being helically preformed, are twisted together to define the hollow core area to receive the core member 26 therein. When it is necessary to assemble my device in the field, it is contemplated that the core member 26 be integrally secured to one leg of the stock whether it be flat stock or wire strand stock.

Figure 16:
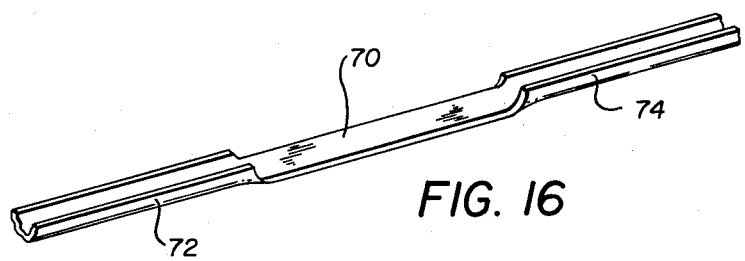
FIGURES 16 and 17 illustrate yet another device for forming the bight portion of a preferred embodiment of the invention wherein the center portion of the element comprises a flat stock section and the end portions are semi-cylindrical in shape to enclose a core member such as shown in FIGURES 16 and 18.
Figure 17:
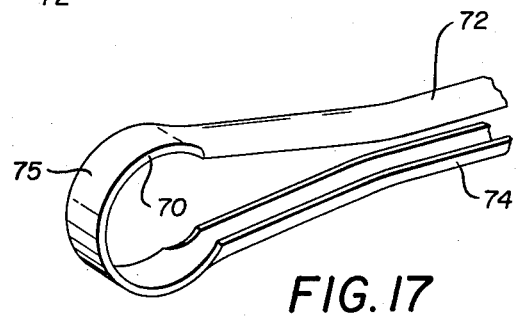

Yet another embodiment of my invention is shown in FIGURES 16 and 17 wherein I employ a flat member 70 having end portions 72 and 74 which are semi-cylindrically formed so that as the center portion is doubled back upon itself to form a bight 75, the end portions are placed in adjacent relationship to define the hollow core area for the cylindrical core member 26.

Figure 18:
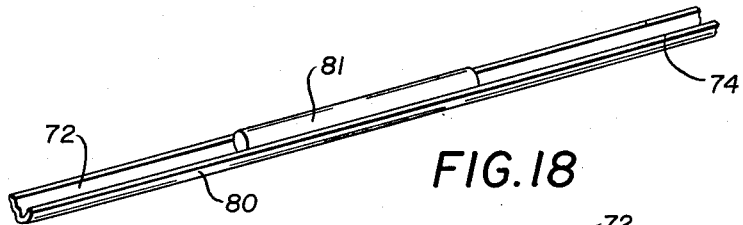
FIGURES 18 and 19 illustrate still yet another device for forming the leg portions of a preferred embodiment of the invention, wherein the center portion of the element comprises a cylindrical section, with end portions semi-cylindrical to enclose a core member.
Figure 19:
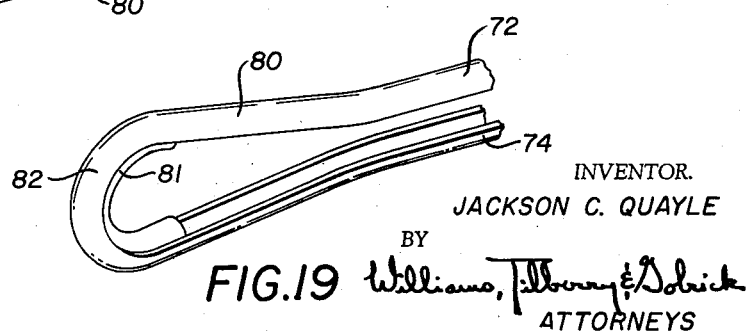

In FIGURES 18 and 19, I combine the teaching of FIGURES 13 and 16 to provide a semi-cylindrical element 80 having a cylindrical center portion 81 deformable into a bight portion 82; and semi-cylindrical leg portions 72 and 74 as already heretofore described.

Reference is now made to FIGURES 20 and 21 illustrating means for making an electrical tap connection to the dead end splice shown in FIGURE 8. A flat tab 100 is made integral with compression sleeve 29 and is provided with a pair of bolt holes 102 and 104. A second compression sleeve 106 is adapted to receive a cable 108 in one end, and the opposite end is formed into a flat tab portion 110 adapted to make surface-to-surface contact with tab portion 100. A pair of open end slots 112 and 114 are provided in tab portion 110 to coincide with bolt holes 102 and 104. A threaded U-bolt 116 is provided with stop members 118 and 119 on legs 120 and 122 respectively, which can be threaded nuts brazed, welded, or otherwise secured thereto. Legs 120 and 122 are aligned to be received in holes 102 and 104 respectively of tab 100 as well as slots 112 and 114 of tab 110 whereby the tabs are secured together by threaded fasteners 124 and 126. By virtue of stop members 118 and 119 and open end slots 112 and 114, U-bolt 116, and tabs 100 and 110 are easily assembled remotely by use of "hot line" tools common to the industry.

A line connector similar to that disclosed in FIGURES 20 and 21 is illustrated in FIGURES 27 and 28. Similar to the embodiment of FIGURE 20, a tab 160 is provided with a pair of holes 162 and 164 to which the legs 166 and 168 of a U-bolt 170 are fitted. A pair of nuts 172 and 174 are secured to the face of the tab 160 and to legs 166 and 168 respectively by means of welding 169 or other metal bonding means. Secured to one end of the tab 160 is a cable compression sleeve 176 adapted to secure one end of a cable therein. It should be noted, also, that on the face 178 of the tab 160 a socket 161 is provided to align and seat with small hemispherical ball portion 180 secured to one face 182 of a second tab 184 to assist in self-alignment between the two tabs. The second tab 184 has a pair of slots 186 and 188 formed therein to align with the legs 166 and 168 respectively of the U-bolt 170, where upon assembly, the socket 161 and the ball 180 are in mating relationship while washer-face nuts 190 and 192 threadedly engage legs 166 and 168 of the U-bolt 170.

Similar to the disclosures of FIGURES 27 and 28, a modification of this arrangement is shown in FIGURE 29 wherein in lieu of a tubular cable receptacle 176, a C-shaped tubular cable receptacle 194 is secured to the tab 196 at right angles thereto to provide a tap connection from a line or cable. The other parts of this disclosure are similar to those elements disclosed in FIGURES 27 and 28.

FIGURE 22 illustrates an electrical tap similar to that shown in FIGURE 20, but completely prefabricated. Thus, a tab 130 is integral with compression sleeve 132. Integral with tab 130 is a second compression sleeve 134 adapted to receive an electrical conductor 136 therein.

By way of cable anchoring means other than the means illustrated in FIGURES 3, 10, 12, 14, 17, and 19, yet another alternative is illustrated in FIGURE 24 wherein a clevis 140 (see FIGURE 25) or an eye bolt 142 (see FIGURE 26) is threadedly engaged in one end 143 of a compression sleeve 144 with or without electrical connector tap means 146. The opposite end 148 of compression sleeve 144 is adapted to secure a cable 150 by compression in accordance with the foregoing discussion.

Thus, I have provided a dead end device for cables and wires which is simple of construction, rugged, comprises a minimum of elements, and is amenable to assembly and dis-assembly in the field with hot lines in a manner to provide a maximum of safety for the linemen as well as an improved and efficient connection.

While the above disclosure illustrates several embodiments of my invention, it will become apparent to those skilled in the art upon an examination of the specification and drawings, that other deviations are possible in details of construction, and I do not intend to be limited in scope to the exact details disclosed, but avail myself of the full scope of the invention as defined in the appended claims.

I claim:

1. A dead end for a cable comprising: a member having a center portion and end portions, said center portion being doubled back upon itself to define a bight, said end portions being preformed to define a hollow core; a cylindrical core member received and enclosed within said hollow core; and a compression sleeve, one-half of which receives said enclosed core member and the other half of which receives the end portion of a cable therein, said compression sleeve being compressed to grip said enclosed core member and said cable end portion.

2. A dead end for cables comprising: a member having a center portion and helically preformed end portions, said center portion being doubled back upon itself to define a bight, said helically preformed end portions being helically twisted together to form a straight portion defining a hollow core; a cylindrical core member received within said hollow core; and a compression sleeve one-half of which receives said straight portion therein, and the other half of which receives the end portion of a cable therein, said sleeve being compressed to grip said core member and said cable end portion.

3. The device set forth in claim 2 wherein said center portion is circular in cross-section.

4. The device set forth in claim 2 wherein said center portion comprises a whole lay of preformed helical elements.

5. The device set forth in claim 2 wherein said center portion comprises a half lay of preformed helical elements.

6. A dead end for a cable comprising: a member having a center portion and end portions, said center portion being doubled back upon itself to define a bight, said end portions being formed semi-cylindrically to define a hollow core; a cylindrical core member received and enclosed within said hollow core; and a compression sleeve one-half of which compressively grips said enclosed core member and the other half of which compressively grips the end portion of a cable therein, said compression sleeve being compressed to grip said enclosed core member and said cable end portion.

7. The device set forth in claim 6, said first mentioned member comprising flat rectangular stock.

8. The device set forth in claim 6, said center portion of said first mentioned member being circular in cross section.

9. In combination, a cable dead end device and electrical conductor tab comprising a cable compression sleeve adapted to receive and compressively grip a cable in one end thereof; a first tab integral with said compression sleeve and projecting normally therefrom; a pair of holes in said first tab; a U-bolt having threaded legs spaced apart to be received in said holes; stop members on each leg to delimit the entry of said legs in said holes; said U-bolt being integrally secured to said first tab with the closed end of said bolt spaced apart from said tab to define an enclosed opening therebetween; a second tab secured to a second cable compression sleeve and having a pair of open end slots therein aligned to receive said U-bolt legs therein; and fasteners threadedly engaged to said legs to hold said tabs in face-to-face contact.

10. In combination, a cable dead end device and electrical conductor tab comprising a cable compression sleeve adapted to receive and compressively grip a cable in one end thereof; a first tab integral with said compression sleeve and projecting normally therefrom; a pair of holes in said first tab; a U-bolt having threaded legs spaced apart to be received in said holes; stop members on each leg to delimit the entry of said legs in said holes; said U-bolt being integrally secured to said first tab with the closed end of said bolt spaced apart from said tab to define an enclosed opening therebetween; a second tab secured to a second cable compression sleeve and having a pair of open end slots therein aligned to receive said U-bolt legs therein; fasteners threadedly engaged to said legs to hold said tabs in face-to-face contact, and one of said tabs being provided with a socket in its face, and the other of said tabs being provided with a hemispherical ball portion, said socket and said ball portion being positioned on their respective tabs so as to provide registration between said tabs when in face-to-face contact.

References Cited in the file of this patent

UNITED STATES PATENTS

| | | |
|---|---|---|
| 2,077,222 | Creager | Apr. 13, 1937 |
| 2,123,122 | Shaw | July 5, 1938 |
| 2,195,569 | Hill | Apr. 2, 1940 |
| 2,761,273 | Peterson | Sept. 4, 1956 |
| 2,902,537 | Salvi | Sept. 1, 1959 |

FOREIGN PATENTS

| | | |
|---|---|---|
| 40,973 | Norway | Feb. 23, 1925 |
| 966,962 | Germany | Sept. 19, 1957 |
| 1,165,974 | France | June 9, 1958 |

OTHER REFERENCES

Publication I: "Crimpit," Bulletin CR–57, published by Burndy Corporation, August 1957, pages 10 and 11.

Catalogue: Locke RM Handylog, third edition, published by Locke Department of the General Electric Company, Baltimore, Maryland, published in August 1952, page 49.